United States Patent [19]

Wagner

[11] Patent Number: 4,692,111
[45] Date of Patent: Sep. 8, 1987

[54] APPARATUS FOR FORMING PLASTIC ARTICLES

[76] Inventor: Curtis D. Wagner, P.O. Box 55753, Houston, Tex. 77255

[21] Appl. No.: 749,734

[22] Filed: Jun. 28, 1985

Related U.S. Application Data

[62] Division of Ser. No. 595,560, Mar. 30, 1984, abandoned.

[51] Int. Cl.⁴ .................... B29C 51/00; B29C 51/42
[52] U.S. Cl. .................................. 425/388; 425/397; 425/400
[58] Field of Search ............... 425/388, 397, 387.1, 425/383, 384, 391, 394, 397, 398, 400, 526

[56] References Cited

U.S. PATENT DOCUMENTS

| | | | |
|---|---|---|---|
| 2,377,946 | 6/1945 | Leary | 425/388 |
| 2,974,366 | 3/1961 | Bauman | 425/388 |
| 3,121,767 | 2/1964 | Welshon | 425/388 |
| 3,341,893 | 9/1967 | Edwards | 425/397 |
| 3,507,007 | 4/1970 | Martin | 425/388 |
| 3,527,854 | 9/1970 | Martin et al. | 425/388 |
| 3,600,753 | 8/1971 | Otto | 425/388 |
| 3,682,571 | 8/1972 | Greenberg et al. | 425/388 |
| 3,746,497 | 7/1973 | Neil | 425/398 |
| 3,784,343 | 1/1974 | Iwasaki | 425/388 |
| 3,914,104 | 10/1975 | Dean et al. | 425/397 |
| 3,988,093 | 10/1976 | Birchenough | 425/388 |
| 4,009,981 | 3/1977 | Rosen | 425/388 |
| 4,252,518 | 2/1981 | Kiefer | 425/388 |

FOREIGN PATENT DOCUMENTS 2101927 1/1983 United Kingdom ............... 425/388

*Primary Examiner*—Willard E. Hoag
*Attorney, Agent, or Firm*—Robert M. Carwell

[57] ABSTRACT

Apparatus for forming plastic articles by a thermoform process. A plastic sheet to be formed is die cut to a predetermined shape, heated, and draped over a male mold extending vertically upward. A vacuum is drawn internally of the male mold forming an imprint in the sheet from a die carried on the outer uppermost surface of the mold. A mating female mold is then lowered about the male mold to press the sheet about the conforms of the outer surface of the male mold until the plastic sets, thereby forming the desired object.

6 Claims, 9 Drawing Figures

APPARATUS FOR FORMING PLASTIC ARTICLES

This is a division of application Ser. No. 595,560, filed Mar. 30, 1984, and now abandoned.

BACKGROUND OF THE INVENTION

This invention relates to methods and apparatus for forming plastic articles, and, more particularly, relates to such methods and apparatus for forming plastic articles by a thermoform process.

In the forming of plastic objects by a thermoform process, it is conventional to provide a roll of plastic stock material to be formed into the desired object. A sheet of the material is pulled outwards from the roll and disposed over a die or mold of the object to be formed and then sealed along the periphery of the mold. The plastic sheet is then heated to a point where it becomes pliable. Next, either positive pressure is applied from above the sheet forcing it into the conforms of the mold or, in the alternative, a vacuum is drawn from below the sheet evacuating the air in the space between the mold surface and the surface of the sheet thereby, in like manner, drawing the surface of the sheet into the conforms of the mold. The mold is typically water cooled, whereby upon contact of the heated plastic against the cool mold, the plastic sets and may thereafter be removed from the mold. The molded plastic is thereafter trimmed by a die cutting process or the like whereby the scrap plastic from the sheet is trimmed away from the desired object.

One problem with such techniques is that the object to be formed is not precut to shape from the plastic roll. Accordingly, virtually the entire forming process relies on the vacuum or positive pressure to draw the plastic about the mold, and thus the shape of the plastic sheet prior to heating does not contribute to the desired object's final shape. Moreover prior techniques, in relying upon the vacuum or pressure, often required sealing or some means of restraining the edges of the plastic sheet to be formed. Thus, beneficial effects of gravity on the edges of the heated sheet in assisting formation of the desired object were neglected.

Accordingly, the present invention overcomes the hereinbefore described problems as well as others, providing a novel method and apparatus for thermoforming plastic articles.

SUMMARY OF THE INVENTION

A male mold is provided having an outer surface extending generally upward and formed in the desired shape of the plastic object to be formed. The mold has a die face on the outer upper surface thereof lying generally in a horizontal plane.

A platform forms a support surface disposed about a central vertical axis extending through the male mold whereby the support surface lies in the horizontal plane of the die face and is perpendicular to the axis. The platform is adapted to be lowered in the direction of the axis to a location adjacent the bottom of the male mold and subsequently raised to the aforesaid initial position.

The platform and male mold are surrounded on four sides and the bottom by an insulated box, and the box, platform, and mold are carried by a structural frame. A heater assembly is further provided which rolls on an upper surface of the frame so as to be removably disposable over the platform. The heater assembly carries a plurality of heating elements capable of heating plastic sheet stock to a temperature whereby it may be readily formed about the male mold. The frame also carries a female mold movable along the aforesaid central axis so as to be removably disposable about and above the male mold.

In operation, a piece of the plastic sheet stock from which the object to be molded is to be formed is placed on the platform. The sheet is precut by means of a die or the like to a shape which will enhance the formation of the desired end shape of the plastic object about the male mold when the sheet is heated and drooped thereover.

Once the plastic sheet has been placed upon and thus supported by the support surface of the platform, the heater assembly is moved into a position above the sheet and the heating elements heat the plastic sheet to the aforementioned desired temperature, whereupon the heater assembly is thence rolled backwards on the frame away from the plastic. The platform is then lowered in the direction of the central axis to the bottom of the box as hereinbefore described, whereby the plastic, now pliant due to the heating thereof, begins to droop over the male mold as the platform lowers.

When the platform has thus lowered to the lower extremity of the insulated box adjacent the lower portion of the male mold, a vacuum is drawn on a cavity internal to the male mold. This cavity is in fluid communication with an area above the die face on the upper end of the male mold by means of a plurality of vacuum ports extending therethrough. When the vacuum is thus drawn and communicated through the ports, the portion of the heated plastic sheet adjacent, above, and supported by the die face of the male mold will be forced to conform to the desired imprint in the die face.

The male mold is desirably provided with a plurality of passages extending throughout the body thereof which receive circulating water. Thus, when the heated plastic has been disposed or drooped about the male mold, contact of the plastic with the cooled outer surface of the male mold will begin to cool the plastic to a setting temperature. While the plastic is thus drooped about the male mold, the female mold assembly is lowered in a generally downward direction along the central axis until it is disposed about the male mold. Thus the female mold causes tighter conformity of the plastic to the outer shape of the male mold while it is cooling. The female mold remains about the male mold for a sufficient amount of time for the plastic to set whereupon the female mold is raised along the axis away from and above the male mold. The platform is thereafter raised to its initial position wherein it forms a horizontal surface generally with the upper dieface of the male mold, thereby lifting the formed plastic object upwards off of the male mold where it can readily be removed.

It is therefore an object of the present invention to provide an improved method and apparatus for forming plastic objects.

Yet another object of the present invention is to provide an improved method and apparatus for forming plastic objects by means of a thermoforming technique.

It is another object of the present invention to provide improved methods and apparatus for thermoforming plastic objects wherein the precut plastic stock to be formed begins initial formation of the object by means of a draping motion over a mold while it is in a heated condition.

It is a further object of the present invention to provide an improved method and apparatus for thermoforming a plastic object employing a combination male and female mold.

These and other objects and advantages of the present invention can be better understood from the following detailed description in conjunction with the drawings, wherein:

DETAILED DESCRIPTION OF THE PREFERRED EMBODIMENT

Figure 1:
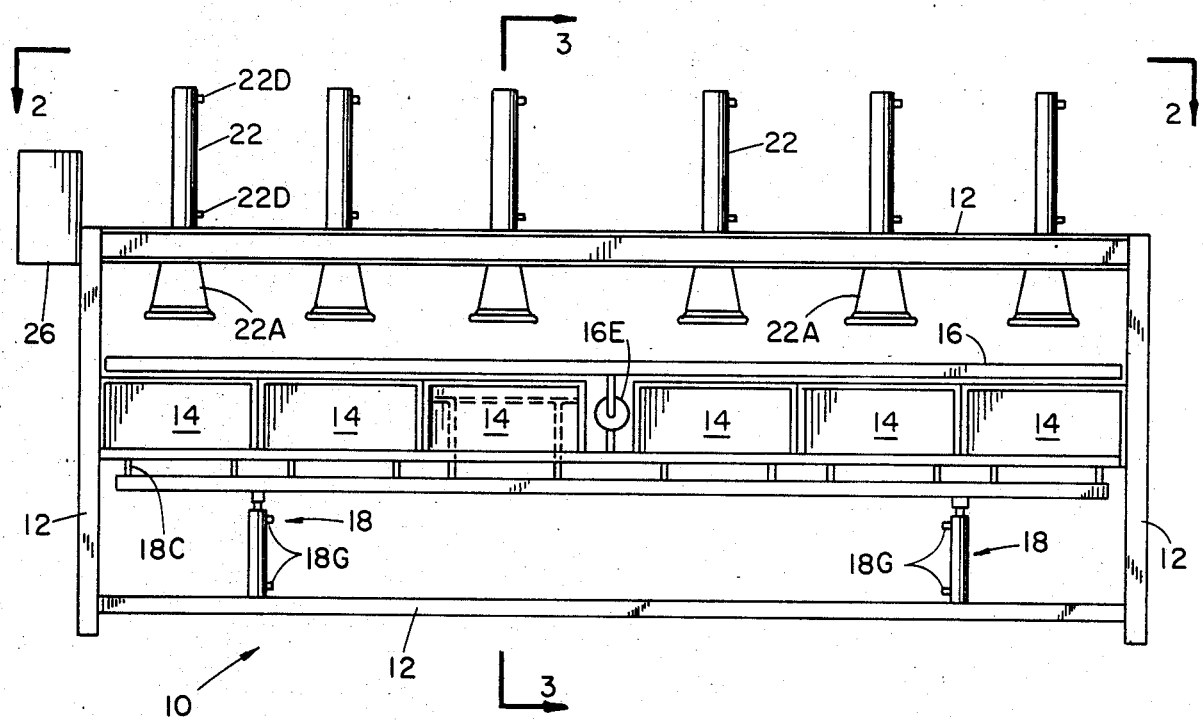
FIG. 1 is an elevational view of a preferred embodiment of the present invention.
Figure 2:
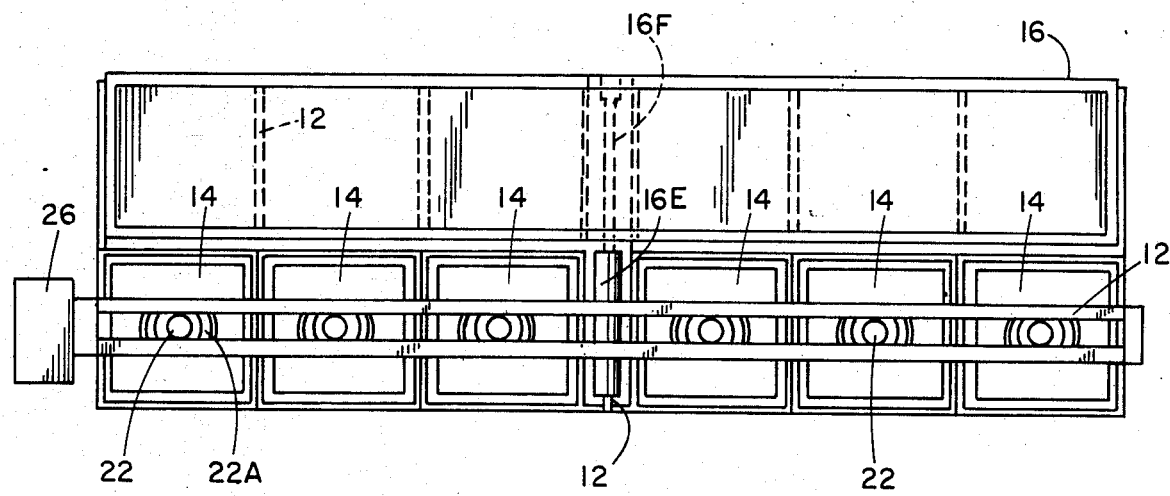
FIG. 2 is a top view of the invention depicted in FIG. 1 taken along line 2—2 thereof.
Figure 3:
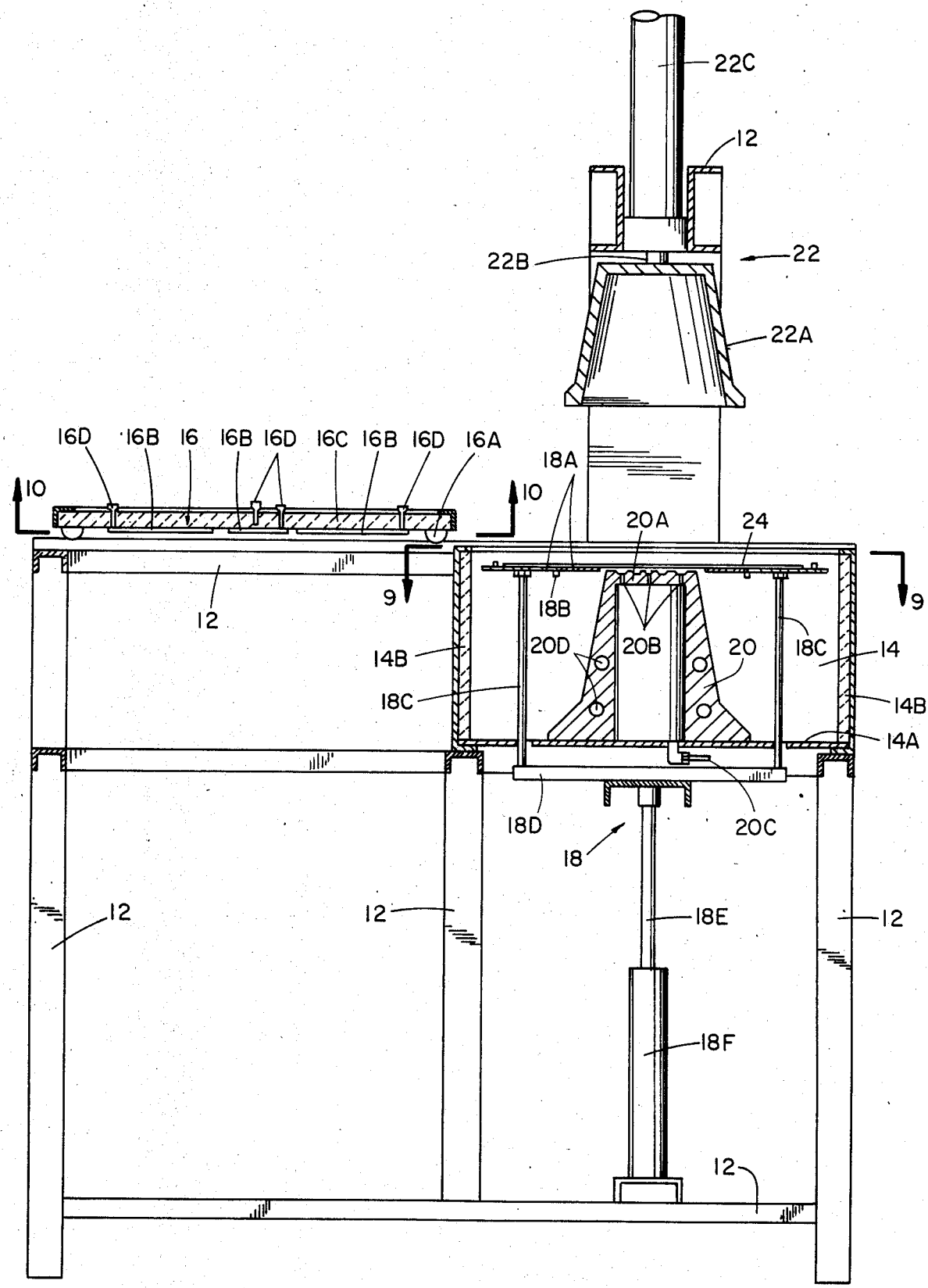
FIG. 3 is a side view of the invention depicted in FIG. 1 taken along line 3—3 thereof and depicting the invention in a state wherein operation thereof is about to commence.

Referring first to FIG. 1, there will be seen depicted therein generally a plastic thermoforming machine 10 of the present invention which is comprised generally of a frame 12, one or more heating boxes 14, each such box 14 having a corresponding heater assembly 16 and platten assembly 18, as well as a male and female mold assembly 20 and 22, respectively, also depicted in more detail in FIG. 3.

Before describing each of the foregoing elements of the preferred embodiment of the present invention in more detail, a general description of the operation of the machine 10 and function of the aforesaid elements will be given. It will be appreciated that the operation and timing of the various elements may be implemented in any number of convenient manners conventionally known in the art. Accordingly, a control box 26 has been depicted in FIG. 1 to schematically indicate that the operation of the various elements may be so controlled. Moreover, for purposes of clarity the various pneumatic and electrical control supply lines associated with such control and operation of the present invention have been deleted inasmuch as they may be provided in a number of manners conventional in the art without departing from the scope of the present invention.

Figure 4:
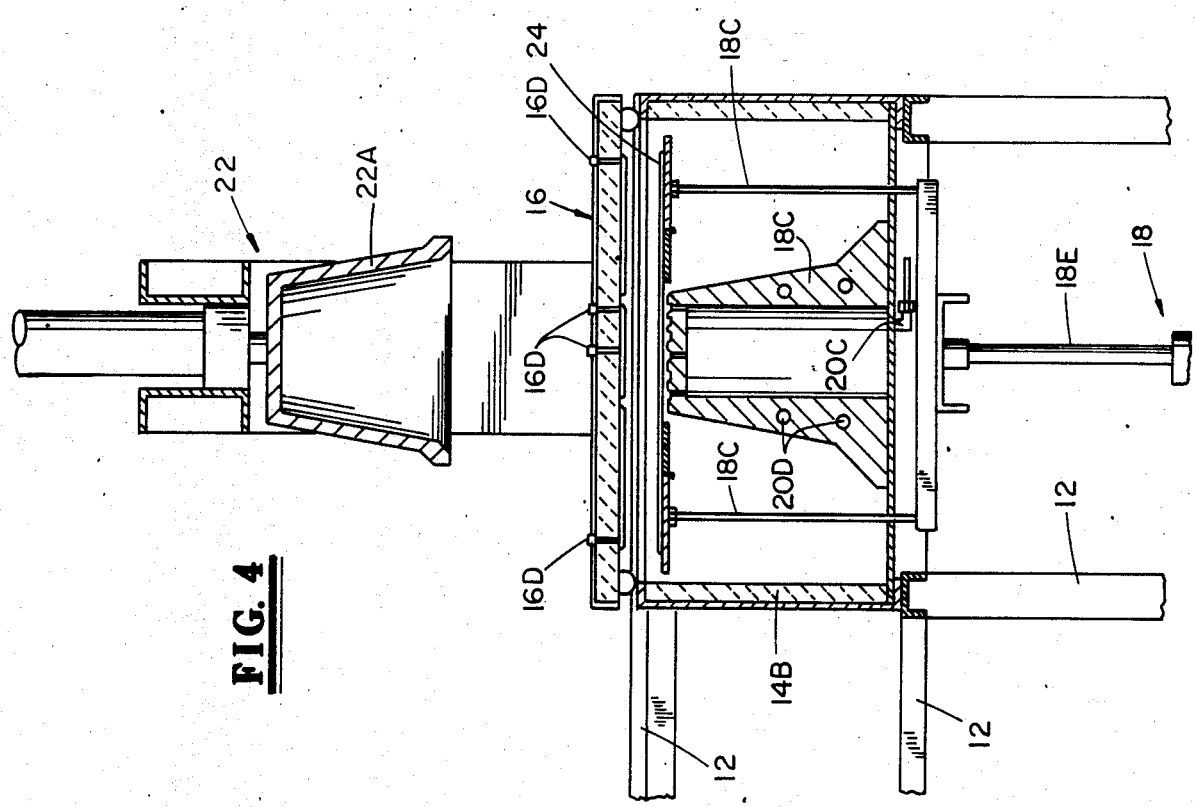
FIG. 4 is a side view of the present invention depicted in FIG. 1 in a different state of operation.

In operation, it will be recalled that the purpose of the machine 10 is to form a piece of plastic sheet into a desired article of manufacture. Accordingly, referring to FIG. 3 and FIG. 8, it will be noted that such a piece of plastic 24 may be disposed horizontally so as to be supported by the platten assembly 18. Referring to FIGS. 3 and 4, it will be seen that the next stage of operation of the machine 10 is that the heater assembly 16 may be moved into a position from that depicted in FIG. 3 to that depicted in FIG. 4 wherein the heater assembly 16 is positioned vertically over the plastic sheet 24. It will be noted that in a preferred form of the present invention, the plastic sheet 24 is die cut to a predetermined shape such as that depicted in FIG. 8 prior to the operation of the machine 10. Moreover, with reference to FIG. 9, it will be noted that the heater assembly 16 is provided with a plurality of heater elements 16b such that when the heater assembly 16 is positioned over the plastic sheet 24, the sheet 24 may be heated to a temperature whereby it becomes more pliant.

Figure 5:
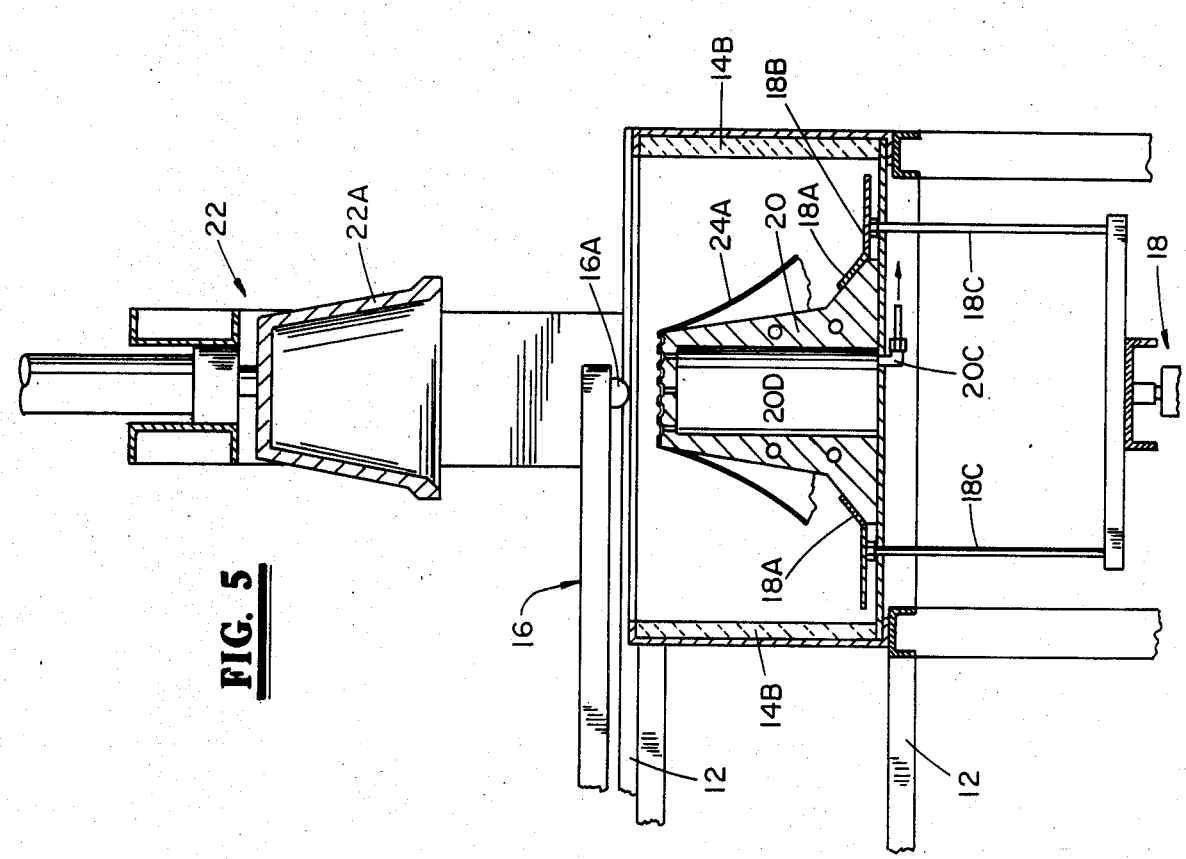
FIG. 5 is a side view of the invention depicted in FIG. 1 in yet another state of operation.
Figure 8:
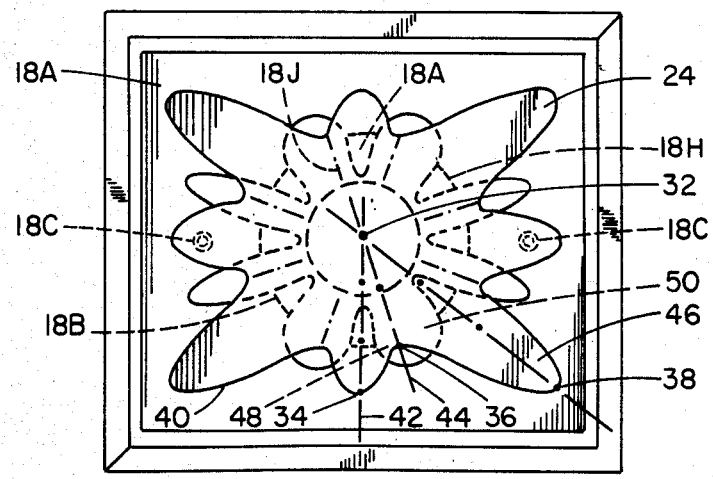
FIG. 8 is a top view of the platten of the present invention showing a plastic sheet disposed thereon, as also depicted in FIG. 3, in preparation for forming, said FIG. 8 being taken along line 9—9 of FIG. 3.

After heating to this temperature has been achieved, in response to suitable timing controls of the control box 26, the heater assembly 16 may be caused to move back to the initial position depicted in FIG. 1. Such movement of the heating assembly 16 may be seen in FIG. 5. During such movement, from a comparison of FIGS. 4 and 5, it will also be noted that the platten assembly 18, also under control of the controls in control box 26, may be caused to lower from the position depicted in FIG. 4 to that of FIG. 5. With reference to FIG. 8, because the platten assembly 18 contains an aperture or hole pattern 18h and further because the plastic sheet 24 has been heated to a temperature wherein it becomes more flexible, upon the lowering of the platten assembly 18 as shown in FIG. 5, the plastic sheet 24 will be caused to droop about the male mold assembly 20.

Next, a vacuum provided from an appropriate vacuum source (not shown) which is connected to a vacuum connection 20c on the male mold assembly 20 will cause a vacuum to be drawn on the internal chamber about which the male mold assembly 20 is formed which, in turn, will cause a vacuum to be drawn through the vacuum ports 20b in the upper surface of the male mold 20. Closer inspection of this surface will reveal that it is preferably a dieface having disposed therein any desired pattern such as the name of the manufacturer or the like. Because this vacuum is drawn after the plastic sheet 24 has been permitted to drape over the male mold and is in a pliant temperature state, drawing of this vacuum will cause the center portion of the plastic sheet 24 to deform into the conforms of the aforementioned dieface so as to imprint such conformities in the plastic sheet 24. Also, as shown in FIG. 5, because the plastic sheet 24 has been permitted to droop over the outer surface of the male mold 20, it will have formed a preliminary shape approximating a pot or container, and thus the sheet 24 of FIG. 4 will be seen to be deformed into this state of a plastic pot 24a of FIG. 5.

Figure 6:
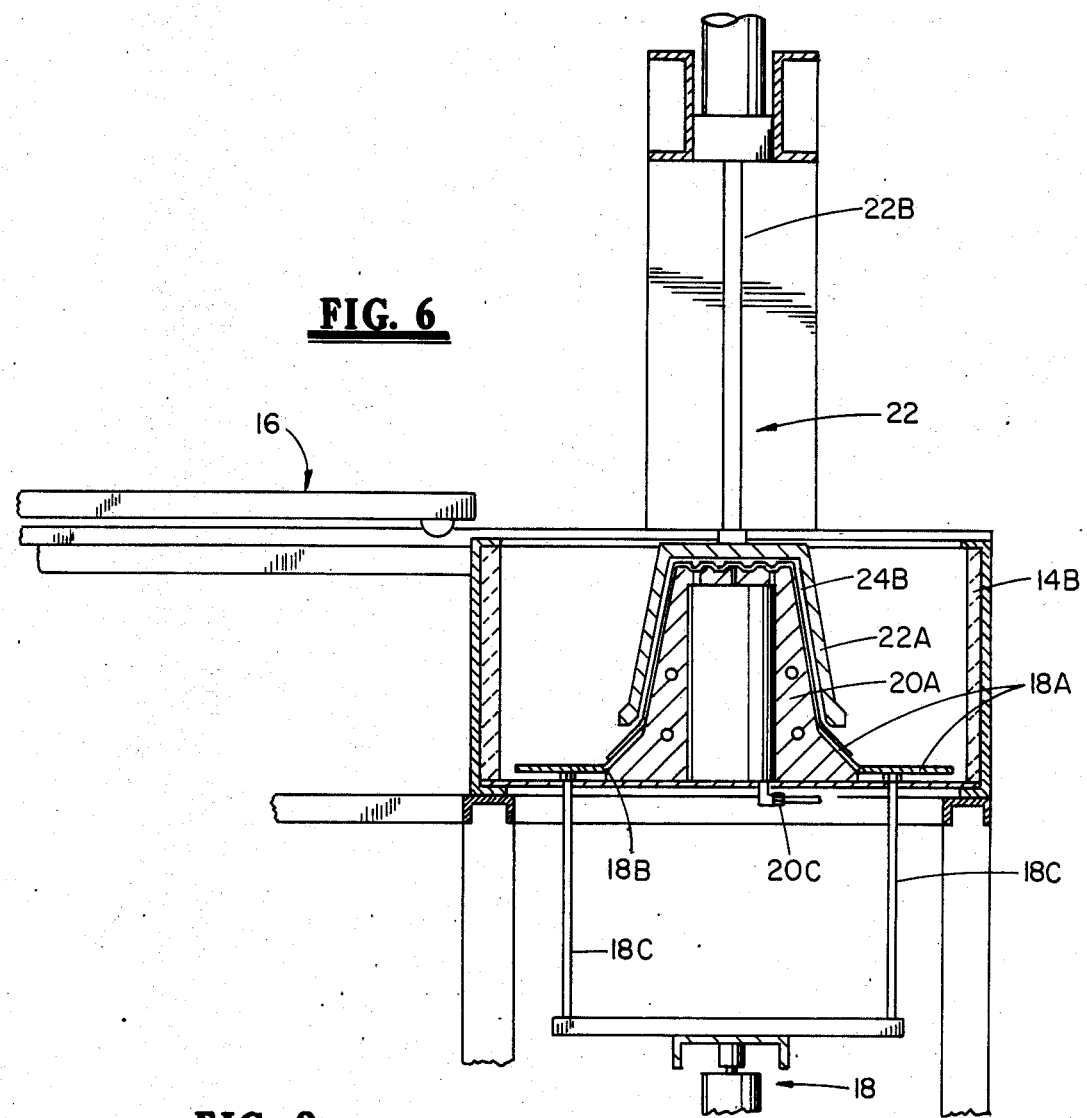
FIG. 6 is a side view of the invention depicted in FIG. 1 in still another state of operation.

Continuing in the general discussion of the operation of the machine 10 of the present invention, with reference to FIG. 6 it will be noted that with the heater assembly 16 removed from its vertical position over the plastic sheet shown in FIG. 4, and with the platten assembly 18 continuing to be in its lowered position, a female mold assembly 22 may thereafter be caused to be lower in response to appropriate control circuitry in the control box 26 so that the female mold 22a of the female mold assembly 22 is brought into mating engagement with the male mold assembly 20. A comparision of FIGS. 5 and 6 will reveal that the purpose of such a step is to cause the drooping outer surface of the plastic pot 24a of FIG. 5 to come into contact with the outer surface of the male mold 20 so as to form the finished shape of the pot 24b depicted in FIGS. 6 and 7.

The male mold assembly 20 is provided with a plurality of water cooling ports 20d which are disposed within the walls of the male mold assembly 20. These ports 20d are connected to a source of water or other fluid coolant in a manner well known in the art whereby such coolant is circulated through the mold assembly 20. Thus, when the pot 24a is forced into contact with the relatively cooler mold assembly 20 by means of the female mold assembly 22, the plastic will be cooled back to the temperature wherein it retains its rigid shape.

Figure 7:
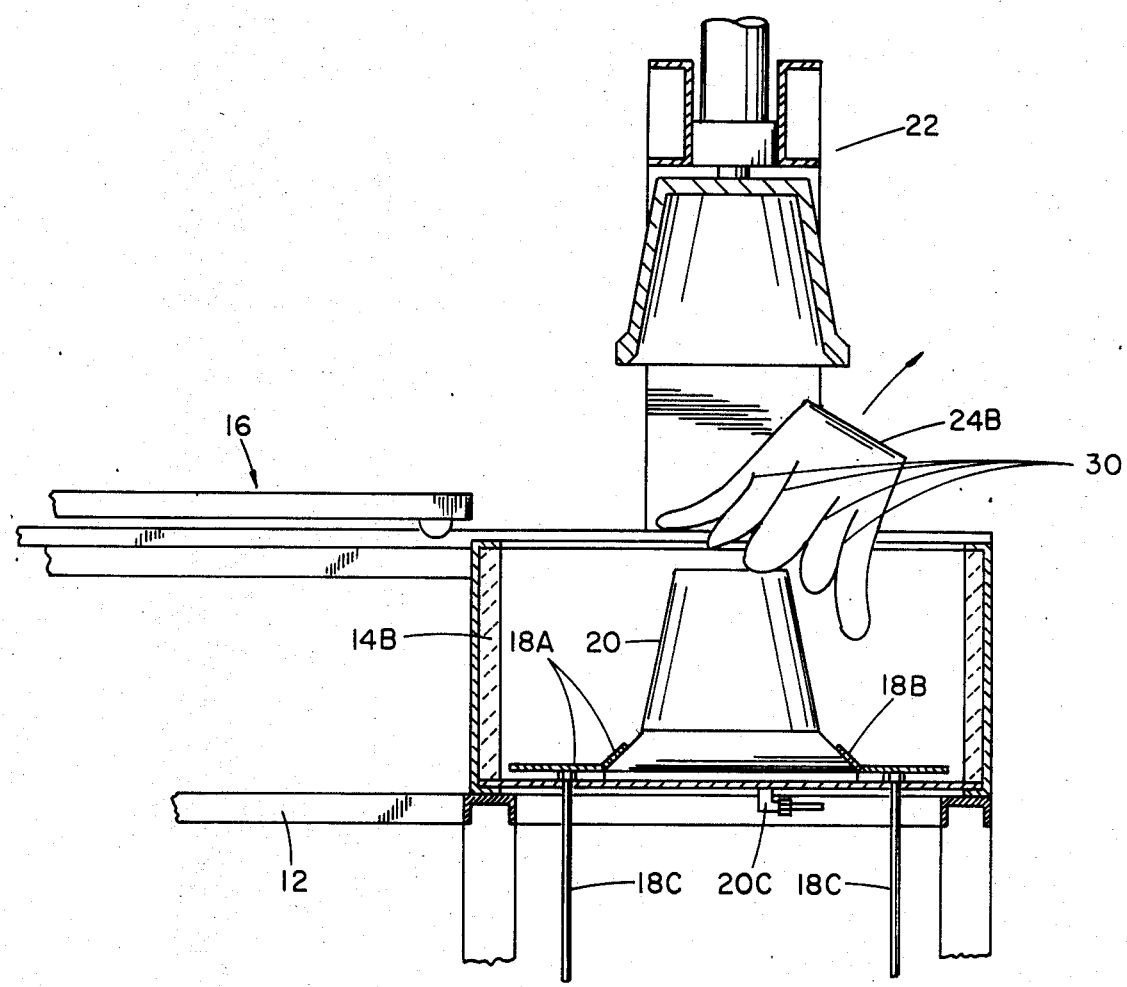
FIG. 7 is a side view of the present invention depicted in FIG. 1 depicting yet still another state of operation.

Next, from a comparison of FIGS. 6 and 7, it will be noted that the female mold assembly 22 may then be lifted up to its initial position, again, by means of appropriate control circuitry contained in the control box 26 well known in the art. Thereafter, the platten assembly 18 may be caused to raise to the position shown in FIG. 4 whereby the final formed plastic object or pot 24b may be lifted off the male mold assembly 20 for easy removal.

In an alternate embodiment, it is in some applications desirable to provide a quart in the female mold 22a such as at the location where piston 22b interconnects with female mold 22a, whereby air can be drawn out of the interior of female mold 22a or a vacuum can be drawn thereon.

This may be done under control of additional control circuitry such as that housed in control box 26 at appropriate times. Thus, for example, as hereinbefore described, it may be appropriate to draw such vacuum after the platform 18a has been lowered and the female mold 22a is also lowered and disposed about the male mold 20 long enough for the plastic 24 to conform about male mold 20, cool, if desired, and form its desired shape. Thereafter, when the vacuum is applied to the interior of mold 22a, it will be appreciated that the thus formed plastic object will be retained within mold 22a due to the vacuum, whereupon the mold 22a may be raised to its initial position shown in FIG. 3 as hereinbefore described. This is to be contrasted, for example, with the previously noted description wherein there is no vacuum provided to mold 22a and wherein the formed plastic object or workpiece is raised above the male mold 20 after formation by vertical motion upwards of the platen assembly 18. In the latter case, a worker must remove the finished piece from the platform 18a and then reload the machine with another yet unformed and precut piece of plastic 24 before the heater assembly 16 may be moved in position over the plastic 24 and the male mold 20. This extra step of manually removing the finished object from the platform 18a may in some instances substantially slow down production. However, in an alternate embodiment presently being described, such removal is not necessary in that the finished piece will be retained within the mold 22a out of the way of the heater assembly 16 which may immediately begin moving into position over the male mold 20 once the female mold 22a has moved upwards with the finished workpiece out of the way and a new piece of unformed plastic 24 has been loaded into the machine.

It will further be appreciated that once the heater assembly 16 has been moved into position to begin heating the next unformed plastic 24, as shown in FIG. 4, the control circuitry may cause the vacuum in female mold 22a to decrease sufficiently so as to let the finished pot 24b or other article to be dropped or deposited on the top of the heater assembly 16. After sufficient heating whereupon the heater assembly 16 is again retracted to the position shown in FIG. 3, it will further be noted that the finished workpiece deposited on the top thereof will be carried away from a position vertically above the heater boxes 14 by means of the motion of the heater assembly 16. The finished article may thereafter easily be removed from the top of heater assembly 16 manually or by means of yet another suitable automated removal means such as a suction pad or the like. It is fully contemplated that whereas a vacuum system provided to the female mold 22a may, in some applications be desirable, in other applications it may be suitable to provide another form of releasably retaining mechanism such as a solenoid carried by female mold 22a with appropriate linkage which may releasably retain the finished product within the female mold 22a under control of appropriate control circuitry.

Now that the overall operation of the machine 10 is understood from the foregoing general discussion, a more detailed description of the structures, methods, and functions of the various elements of the present invention will be given.

First, with respect to the frame 12, it may admit to a wide variety of configurations serving primarily to support the heating boxes 14, heater assemblies 16, mold assemblies 20 and 22, and platten assembly 18, as well as to support the various other components to be hereinafter described in a manner so as to permit the relative motion of the various elements.

Referring more particularly to the insulated boxes, they are preferably comprised of any appropriate insulating and heat resistant material and will have four sides 14b and a base 14a, all of which serve the purpose of retaining the heat from the heater assembly 16 while the plastic 24 is being heated to its pliant state and formed about the male mold assembly 20. Such insulating boxes 14 may be seen more clearly depicted in cross-section in FIG. 3.

Figure 9:
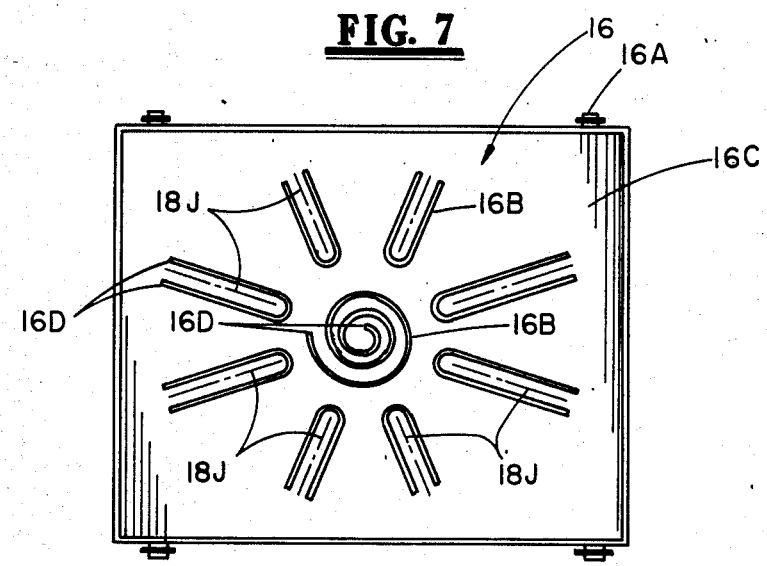
FIG. 9 is a bottom view of the heater assembly of the present invention depicted in FIG. 3 and taken along line 10—10 thereof.

The heater assembly 16 is preferably comprised of a number of components which may be seen more clearly in the bottom view thereof depicted in FIG. 9. A plurality of rollers 16a are provided on the outer edges of an insulated pad 16c so that the heater assembly 16 may roll on the frame 12 between the position shown in FIG. 3 and that of FIG. 4. While this movement may be effected by a number of means, it has been found convenient to provide a heater cylinder 16e and heater piston 16f connected between the frame 12 and a plurality of such heater assemblies 16, the latter of which are rigidly interconnected, whereby upon actuation of the piston cylinder assembly 16e–16f from the control box, the entire plurality of heater assemblies 16 may be simultaneously moved at will from the position of FIG. 3 to that of FIG. 4 or vice-versa.

Still referring to FIGS. 3 and 9 and the construction of the details of the heater assembly 16, there will be seen depicted therein a plurality of heater elements 16b each of which terminate in respective heater terminals 16d. These terminals may be wired in a conventional manner known in the art and interconnected to appropriate circuitry including rheostats for each heater element 16b, whereby power to each of the heater elements 16b may be individually controlled at will so as to control their relative temperatures.

In one preferred embodiment of the present invention, it will be noted that the initial plastic stock from which the final pots 24b shown in FIG. 7 are formed, has been pre-die cut in flat sheet form to a shape such as that shown in FIG. 8. FIG. 8 depicts a top view of the platten assembly 18. It will be noted that a hole pattern 18h has been cut in the platform 18a which forms a horizontal surface whereby the platform 18a does not provide support for the plastic sheet 24 at a plurality of droop locations 18j. A comparison of FIGS. 8 and 9 will reveal that the heating elements 16b of the heating assembly 16 are desirable located vertically above these droop locations 18j when the heater assembly 16 is brought into the position depicted in FIG. 4. The reason for this is to insure that the portions of the plastic sheet 24 shown as droop locations 18j will be permitted to droop below the horizontal surface formed by the platform 18a due to gravitational force during heating prior to lowering of the platten assembly 18 from the position shown in FIG. 4 to that of FIG. 5. Moreover, it has been found desirable to insure that heating occurs at these droop locations 18j so that when the plastic sheet 24 is permitted to droop about the male mold 20 as shown in FIG. 5, again due to gravitational force and weight of the heated plastic supported by platform 18a folding will occur in the plastic sheet 24 at these droop locations 18j so as to cause overlapping of the plastic sheet at these locations whereby the folds depicted in the final pot 24b are formed. It will be noted that while one pre-cut shape of the plastic 24 has been depicted, the invention admits of one desired shaped and is not intended to be limited only to that depicted herein.

Still referring to the platten assembly 18 as depicted in more detail in FIG. 3, it may be provided with a plurality of hinges 18b (also shown in FIG. 8). When the platten assembly 18 is lowered to a position within the insulating box 14 such as the position shown in FIG. 5, the hinged portions of the platform 18a will thus be moved in an upward direction as the plastic sheet 24 is deposited as pot 24a about the male assembly 20. From reference to FIG. 6 it will be appreciated that once the platten assembly 18 has moved upwards from the position depicted in FIG. 6 to that of FIG. 4 after the pot 24b has been formed, the portions of the platform 18a hinged by hinges 18b will again move back to their horizontal position lifting the finally formed pot 24b of FIG. 6 upwards off the male mold assembly 20.

As hereinbefore noted in the prior art, the object to be formed was drawn tightly into conformity with the male mold 20 either by a strong vacuum, tight conformity between inner surface of female mold 22a and male mold 20 (i.e., lack of clearance therebetween) or a combination of both. Thus it was important to provide a substantial amount of uniform heating over the entire surface of the unformed plastic 24 to insure conformity about the outer surface of mold 20. Moreover, often it was necessary to utilize relatively thin cellophane-type plastic materials 24 to achieve such deformation and tight conformity about mold 20 resulting in flat and often bonded folds in the final object as well as weak structural integrity.

In the present invention, however, it has been found that by precutting the unformed plastic 24 to the desired shape, by providing non-uniform heat at selected locations such as heating radially along lines where folds are desired, by permitting draping of the areas so heated as at droop locations 18j of FIG. 8, and by permitting sufficient clearance between molds 22a and 20, a looser folding in the surface of final pot 24b has been achieved.

Moreover, such effect has been achieved or assisted mechanically, thus obviating the hereinbefore noted needs of the prior art for pressure or vacuum in the formation, and further permitting use of heavier stock plastic. It will be appreciated that because the accompanying drawings are not to scale, it may appear, for example, in FIG. 6, that relatively little clearance between molds 22a and 20 is provided. However, in practice it has been found that clearance of as much as one-quarter (¼) inch or more between the molds may produce very satisfactory results.

Still referring to the platten assembly 18 depicted in FIG. 3, it will be appreciated that it would be desirable to provide for automated movement of the platten assembly 18 between the position shown in FIG. 3 and FIG. 5. Accordingly, although a number of means may be provided for achieving this result well known in the art, it has been found convenient to provide a piston 18e and cylinder 18f whereby the piston-cylinder assembly 18e-f is interconnected at one end to the frame 12 and at the other end to a base 18d which, in turn, is connected by means of platform rods 18c to the platform 18a. The cylinder-piston assembly 18e-f may be actuated in like manner to the piston-cylinder assembly 16e-16f by means of an appropriate hydraulic supply under control of appropriate control and timing circuitry contained in control box 26. Also in like manner to the heater assembly 16, it is desirable to rigidly interconnect all of the platten assemblies 18 whereby only one piston-cylinder assembly 18e-f may be required to simultaneously move all of the platform assemblies 18 to the desired positions. Connection of the hydraulic source may be seen depicted as ports 18g in FIG. 1 and, of course, such like ports may be provided for the cylinder 16e.

Referring now in more detail to the female mold assembly 22 depicted in FIG. 3, the female mold assembly 22 will be comprised generally and preferably of a female mold 22a which may be disposed in mating engagement about the outer surface of male mold 20. The female mold 22a may further be interconnected to the piston 22b and cylinder 22c assembly which also comprise the female mold assembly 22 generally. In like manner to the piston-cylinder assemblies 18e-f and 16e-f, the piston-cylinder assembly 22b-22c may be provided with appropriate hydraulic ports and hydraulic control lines routed to a hydraulic source and placed under control of appropriate control and timing circuitry housed in control box 26. In response to such hydraulic pressure and control, the piston-cylinder assembly 22b-c may be caused to lower the female mold 22a over the female mold 20 as depicted in FIG. 6 and to withdraw the female mold assembly 22a to the initial position depicted in FIG. 3, all occurring at the appropriate times which have been previously discussed.

While one particular embodiment and method of the present invention have been depicted herein, it will be readily appreciated that the invention admits of several alternate embodiments. For example, whereas a plurality of heater box 14, heater assembly 16, platten assembly 18, male and female mold assemblies 20 and 22, respectively, have been shown operating in concert to produce a plurality of copies of a desired plastic article simultaneously, it is specifically contemplated that it is a matter of choice whether to operate only one such assembly 14, 16, 18, 20, and 22, or any number of multiples thereof.

Moreover, it is also contemplated that whereas one desirable structure and method for causing concerted operation of these assemblies has been shown, the invention admits of several variations and alternate structures and methods for accomplishing this operation, such as the manual movement of the various components.

In some applications, it may be desirable to substitute a female mold assembly for the male mold assembly 20 and a male mold for the female mold asssembly 22. In such a case, rather than the plastic 24 draping over and around the outside male mold 20, the heated plastic would drape into the female mold. The descending male mold would then enter the cavity of the female mold forcing the plastic 24 against the inner surface of the female mold. Such operation may be envisioned by imagining the removal of the male mold 20 and substitution therefor with a mold such as the female mold 22a which has been inverted from the orientation depicted in FIG. 3. In like manner, the female mold 22a would have substituted therefor, the male mold 20 which would, in like manner, be inverted from the orientation depicted in FIG. 3. Still further, regardless of whether the male-female mold arrangement of FIG. 3 or the reverse thereof just described is employed, in some applications it may further be desirable to eliminate the upper mold, thus permitting the heated plastic to either droop about the lower male mold 20 as shown in FIG. 5 until it cools and cures, or permitting the plastic to droop into the lower female mold until it cures.

Yet another alternate embodiment of the present invention specifically contemplated would be to cause the male mold assembly 20 depicted in FIG. 4 to move upwards thereby lifting the plastic sheet 24 off the platten assembly 18, thus causing the sheet 24 to still drape about the male assembly 20 as shown in the pot 24a of FIG. 5. Still further the male mold 20 may be caused to move upwards into a stationary female mold 22. Thus, it will be appreciated that not only can the arrangement of the male and female mold assemblies be switched, but once the plastic is heated and disposed therebetween the relative motion between the two mating mold assemblies may be accomplished by the lower mold moving upwards, the upper mold moving downwards, or a combination thereof.

In some applications, it may even be desirable to dispose a piece of heated plastic between a male and female mold which are in coaxial alignment along an axis which may not necessarily be vertical as depicted in FIG. 1, but rather disposed off the vertical even to a point where the axis may be substantially horizontal. In this case FIG. 4, for example, would then be a top view rather than a side view of the machine 10. In such a case, it would contemplated that the heated plastic sheet 24 would simply be suspended by some appropriate manner between the male and female mold prior to inward motion of the molds relative to one another to form the desired article.

It is specifically contemplated that the hereinabove described structure and methods are particularly adaptable to forming an article of manufacture such as the pot 24b depicted in FIG. 7 and the article shown in my co-pending design Pat. application Ser. No. 544,581, filed Oct. 24, 1983, although such structure and method of the present invention may be adapted to production of a wide variety of end products. Thus, the invention is not limited to an initial plastic sheet having the geometric configuration such as sheet 24. Moreover, the invention does not necessarily require that the platform 18a be provided with apertures or hole patterns 18h therethrough nor does it necessarily require heating of the plastic sheet 24 at the plurality of droop locations 18j nor does it necessarily require the combination thereof. However, it has been found in one particular embodiment desirable to provide such combination to insure the proper uniform formation of the folds depicted in the surface of the final article 24b.

In the preceeding discussion of the background of the invention, it was noted that it is conventional to dispose a piece of heated plastic over a mold and then to either provide positive pressure or a vacuum to force the pliant plastic into the conforms of a mold shape. In a broader sense, the teachings of the present invention include formation of the desired article of manufacture by disposing heated plastic over a mold and permitting gravity to, at least in part, cause the plastic to drape over the mold thereby causing it to assume the conforms of the mold.

Due to the wide variety in the thermal properties, composition, thickness and the like of the raw stock plastic materials from which objects may be formed in accordance with the present invention, the invention admits of wide varieties in the types of raw stock materials which may be successfully used as well as the timing cycles for the various steps described herein. For example, with some materials more or less heating or more or less time for the draping of the material about the mold prior to the mating engagement with the mating mold, and the like, may be required. Similarly, in some applications, the cooling provided by the ports 20d may be dispensed with or, alternatively, may be provided by likeports in the mating mold such as mold 22a either alone or in combination with those of mold 20. Still further, it should be clear that the provision for making an imprint in the plastic 24 by means of the die face 20a is a matter of choice and is not required in all instances.

Still further, it is not necessarily essential that heating of the plastic 24b be achieved by means of the heater assembly 16. Rather, it may in some instances be desirable to preheat the plastic 24 by some other means and then load it manually or otherwise on the platten assembly 18. However, one particularly desirable aspect of providing a heater assembly such as 16 is that it is specifically contemplated that the temperature of each of the individual heating elements 16b may be individually controlled and timed. Moreover, the precise number and location of the heating elements 16b and the heating assembly 16 may be varied in relation to the particular geometric configuration of the plastic sheet 24 and/or the hole patterns or apertures 18h so as to provide varying proper amounts of heat and in the proper locations so as to cause the desired draping over the mold assembly 20 and formation of the proper folds in the final article 24b. Still further, in some applications it has been found desirable to locate reflectors as shown in FIG. 9 which may even hang down from the surface of heater assembly 16 between outer heating elements 16b to direct heating to the desired locations on plastic 24 along droop locations 18j.

A more detailed description of the location on the plastic sheet 24 wherein the folds 30 are formed in the final container or pot 24b will now be given. With reference to FIG. 8, a central axis 32 may be defined perpindicular to the plane formed by sheet 24 and extending from a location generally in the center of the sheet 24 outwards away from the paper. On the outer periphery 40 of the sheet 24, there may further be seen first, second and third points 34, 36 and 38, respectively, each of these points in conjunction with the center axis 32 forming respective first, second and third lines 42, 44, and 46, respectively. Lines 42 and 44, in turn define a surface area 48 therebetween, and in like manner, lines 36 and 38 define a surface area 50. The folds such as fold 30 on pot 24b of FIG. 7 may be seen to be formed by at least a portion of surface area 48 overlapping a portion of surface area 50 and extending radially outwards of central axis 32 or, conversely, a portion of surface area 50 overlapping a portion of surface area 48 and extending radially outward from the axis 32. Whereas discussion has centered only on one such fold 30, it will be appreciated that a plurality of such folds may be disposed in the final article 24b which will be defined by similar first, second and third points and lines and similar first and second areas 48 and 50. The first such point 34 would of course correspond to another outermost tip of the periphery 40, the second point 36 would correspond to a point on periphery 40 adjacent point 34 and radially inwards, and the third point 38 would correspond to another point on the periphery 40 at another outermost tip thereof of sheet 24 whereby the second point 36 would have first and third point 34 and 38 on either side of a line extending through the central axis 32 and the second point 36.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

What is claimed is:

1. Apparatus for thermoforming a plastic sheet into an article, comprising:
   a first mold means;
   platten assembly means for disposing said sheet adjacent said first mold including
      means for providing relative motion between said platten assembly and said mold; and
      a platform disposable about said mold;
   heating means for heating said sheet in an amount sufficient to cause at least a portion of said sheet to conform to said mold; wherein
      said means for providing relative motion moves said platform between locations generally upwards of and downward relative to said mold; and
   a second mold means removably disposable about said first mold means;
   wherein said platform defines a pattern of plural radially extending apertures at which said sheet is free of subjacent support, said apertures providing droop locations for a heated said sheet.

2. Apparatus for thermoforming a plastic sheet into an article, comprising:
   support means for carrying said sheet and defining a pattern of radially extending through apertures;
   first mold means;
   heating means for concentrating heat on said sheet, when carried on said support means, along a plurality of heated locations extending radially outwards from the center of said sheet and adjacent said apertures; and
   support moving means for vertically positioning said support means relative to said first mold means between
      a first position wherein said support means is above said first mold means, and
      a second position wherein at least a portion of said first mold means extends upward through said hole pattern of said support means.

3. The apparatus of claim 2 wherein
   said pattern provides a plurality of locations extending radially outwards from the center of said support means at which a heated sheet can droop through said apertures, with said plurality of said heated locations being vertically aligned with said heating means.

4. The apparatus of claim 3 further including:
   second mold means conformably engageable with said first mold means; and
   mold moving means for relatively vertically positioning said first and second mold means at first and second positions in vertical registry.

5. The apparatus of claim 4 wherein:
   a space is defined between said first and second mold means when said first and second mold means are in said first position;
   said first and second mold means are in said conforming engagement when in said second position; and wherein said apparatus further includes
   means for moving said heater means horizontally into and out of said space between said first and second mold means at first and second positions, respectively.

6. The apparatus of claim 5 further including:
   control means for sequentially relatively controlling said support moving means, said mold moving means, and said heater moving means to define
      a first state with
         said support means, said first and second mold means, and said heater means in said first positions, and wherein said sheet is heated in an amount sufficient for portions of said sheet to droop downwards at said droop locations;
      a second state with
         said support means and said first and second mold means in said first positions; and
         said heater means in said second position;
      a third state with
         said first and second mold means in said first position; and
         said support means and said heater means in said second position; and
      a fourth position with
         said support means, said first and second mold means, and said heater in said second position.

* * * * *